Oct. 13, 1953     R. B. PFEIFER ET AL     2,655,299
VISOR SUPPORTED POCKET FOR AUTOMOTIVE VEHICLES
Filed Nov. 29, 1950     2 Sheets-Sheet 2
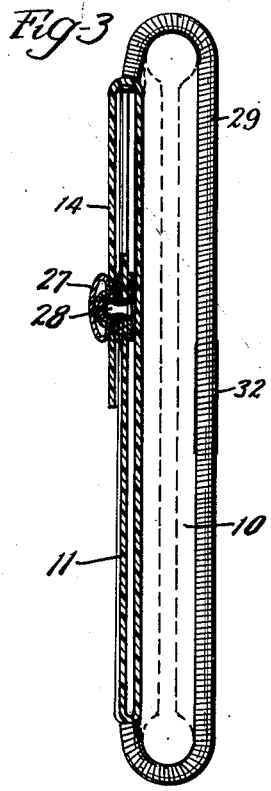
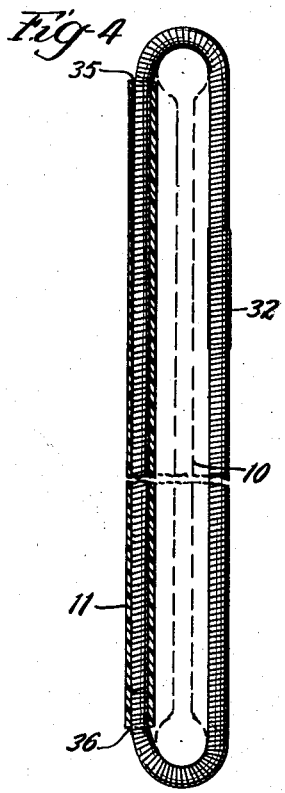
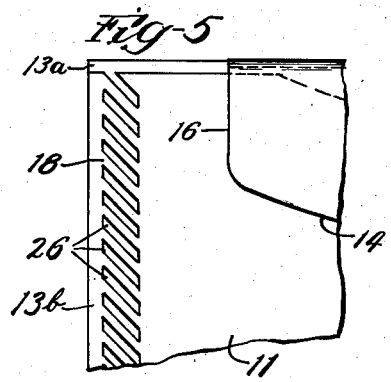
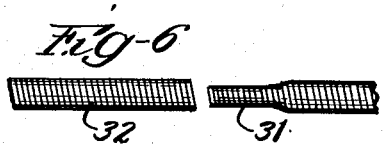
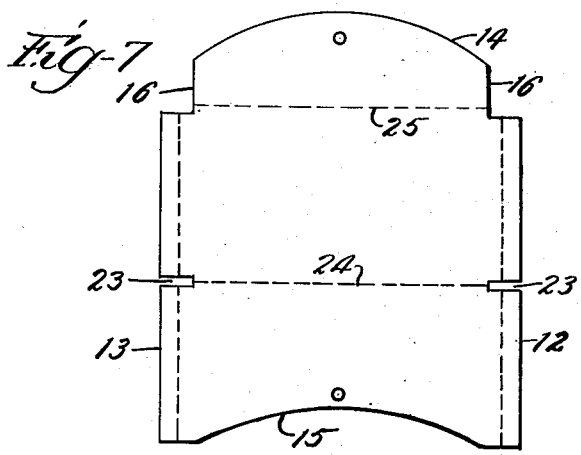
INVENTORS.
Raymond B. Pfeifer &
Leslie Gilbert Heyden
By: Robert H. Wenelt Atty.

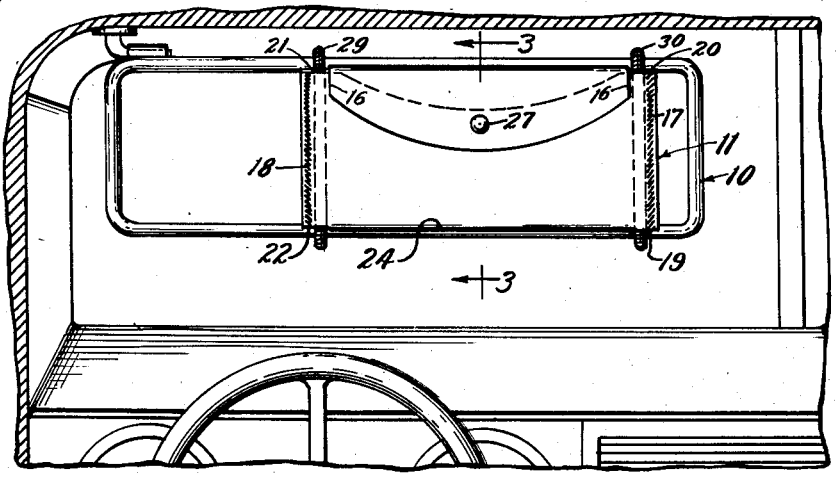
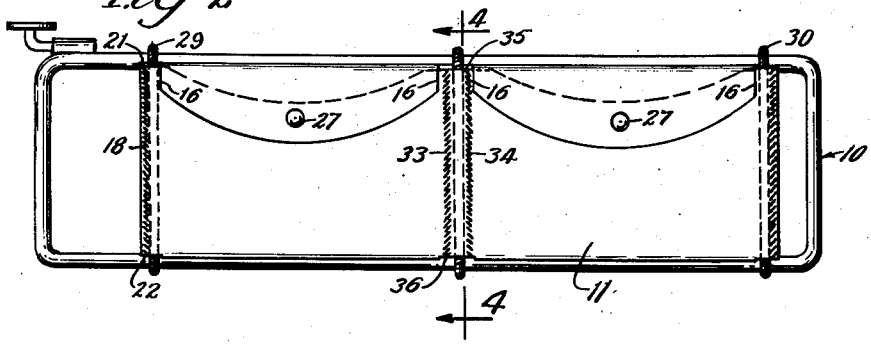

Patented Oct. 13, 1953

2,655,299

UNITED STATES PATENT OFFICE 2,655,299

VISOR SUPPORTED POCKET FOR AUTOMOTIVE VEHICLES

Raymond B. Pfeifer and Leslie Gilbert Heyden, Chicago, Ill., assignors of one-third to Robert H. Wendt, Chicago, Ill.

Application November 29, 1950, Serial No. 198,128

2 Claims. (Cl. 224—29)

The present invention relates to visor supported pockets for use on the visors of automotive vehicles, and is particularly concerned with the provision of an improved pocket unit which can be conveniently attached to any visor, and which, by virtue of its improved construction, is maintained in a flat condition so far as permitted by the contents.

One of the objects of the invention is the provision of an improved visor pocket which is strong in construction and transparent so that it is capable of being used for a long period of time without it being torn or destroyed at the seams or elsewhere by rough usage or by virtue of the weight of the contents.

Another object of the invention is the provision of an improved method of making such pocket units, by means of which the operations may be cut down to a minimum, the units may be made in large quantities at low cost, and the materials employed are also reduced to a minimum without substantial waste.

Another object of the invention is the provision of an improved visor pocket structure which is not only adapted to be secured and maintained in a flat condition on the visor, but which has provision for the support of extra maps, pencils and other relatively long articles on the back side of the visor.

Another object is the provision of an improved visor supported pocket unit which may be constructed in single or double pockets with a minimum amount of labor, and which is adapted to utilize to the utmost the supporting space provided on the side of an automotive vehicle visor.

Other objects and advantages will be apparent from the following description and the accompanying drawings, in which similar characters of reference indicate similar parts throughout the several views.

Referring to the drawings, of which there are two sheets accompanying the specification, Fig. 1 is a front elevational view of a visor supported pocket shown in position on the visor of an automotive vehicle and embodying the invention in the form of a single pocket;

Fig. 2 is a similar view of a double pocket unit;

Fig. 3 is a cross-sectional view taken on the plane of the line 3—3 of Figure 1, looking in the direction of the arrows;

Fig. 4 is another sectional view taken on the plane of the line 4—4 of Figure 2;

Fig. 5 is an enlarged fragmentary elevational view, showing the construction of the pocket or envelope at its edge and the particular mode of effecting a joint or seal;

Fig. 6 is an enlarged view showing the two ends of the coil springs in position to be joined together to form an endless tension member; and Fig. 7 is a plan view on a reduced scale, showing the pattern for an envelope unit of the type of Figure 1.

Referring to Figures 1 and 2, 10 indicates the visor of an automotive vehicle which is shown equipped in Figure 1 with an envelope or pocket 11 embodying the invention.

The envelope or pocket unit 11 is preferably constructed of tough, flexible, transparent or translucent plastic material which is inert to the action of acids, alkalis, and will not be destroyed merely because of the corrosive nature of the contents which may be placed in it.

Various types of plastics may be employed in the form of flexible sheets, such as vinyl resins, polyethylene, polyamide resins, polyvinyl resins, vinyl chloride-acetate resins, cellulose acetate resins, but we prefer to use a vinyl plastic in the form of a sheet.

The weight or thickness of the sheet may be varied, and a thickness of 12 to $20/1000$ is considered suitable, but we prefer to use about $15/1000$ thickness.

If the sheet material used is transparent or partially transparent, this adds to its utility by enabling the user to locate quickly the articles in the pocket, as much hunting can be saved by the visibility of the articles contained therein.

The pocket unit or envelope 11 is preferably made of such a pattern as to reduce the wastage of sheet material to a minimum, and such a pattern is shown in Figure 7.

The pattern has a pair of parallel edges 12 and 13, and is substantially rectangular in shape except that the flap formation 14 at one end is complementary to the cut-out 15 at the other end, where it is concavely curved. In order that the flap may overlap the opening in the envelope, which opening is represented by the cut-out 15, the flap is provided with straight, short side edges 16, thus making the flap wider than the cut-out 15.

The flap is also preferably made shorter than the envelope or pocket unit so that there is sufficient space in the body of the envelope at each end of the flap for the seam, indicated at 17 and at 18, and additional space for openings 19–22 at each of the four corners of the envelope.

These openings are brought about by the fact that there is a slit 23 in each of the side edges 12 and 13, along the line of fold, which is indicated by a dotted line 24 in Figure 7, and the seam is located outwardly of the slit 23 and outwardly of the ends 16 of the flap.

This leaves the bottom and the top of the envelope or pocket unit open at the four corner apertures 19–22, because the fold along the line 24 at the bottom and the fold along the line 25 at the flap terminates short of and spaced from the seams 17 and 18.

The present pocket unit may have its adjacent edges secured together in various ways, but we prefer to use an improved method of securement because it is not subject to the disadvantages of stitching, where the stitches tear the material and pull out, nor the disadvantages of cementing, where the cement may let go when the pocket is caused to bulge by the insertion of relatively large articles.

The structure of our envelope at the seams 17 and 18 is shown in Figure 5, where 13a and 13b represent two parts of edge 13, which have been brought into alignment and secured together by discontinuously fused at spaced points the material of which the envelope has been constructed.

This fusing action is preferably accomplished by passing high frequency currents through the edge portions of the material, the frequency and current intensity being such that the parts are integrally fused together without melting or destroying the plastic.

This is accomplished by pressing the edges 13a and 13b together by means of a pair of dies or electrodes, the high frequency current passing from one electrode to the other through the insulating plastic.

Various forms of pressure surfaces may be used on the dies or electrodes, such as, for example, one continuous rib having a flat surface; but we prefer to provide the dies or electrodes with a multiplicity of diagonally extending, parallel, rectangular lugs, which when subjected to pressure during the passage of the high frequency current produce a multiplicity of parallel, diagonally extending rectangular flat depressions 26.

The lugs which form the depressions or flat surfaces 26 are longer in one dimension, and this gives a greater length of seam and a greater width of fused area, thus making the seam stronger and more durable and permitting the uniform distribution of the current over the area in which the seam is to be formed.

The blank pattern of Figure 7 is folded upon itself along the line of fold 24, and its edges are secured together with seams of the type described at 17 and 18.

The flap is preferably provided with a snap fastener having a female part 27, carried by the flap, and a male part 28, directly under it, carried by the front part of the body of the envelope, these parts being located so that the flap overlaps the front of the body of the envelope.

Various modes of securing such an envelope or pocket to a visor may be employed, but we have found that it is preferable to employ endless tension members 29, 30, in the form of helical coil springs made of relatively fine, resilient steel wire, the coils being closely wound in engagement with each other.

Such a helical spring coil may be of uniform diameter throughout its length except for one small end portion 31, the turns of which are sufficiently smaller in diameter so that the end portion 31 may be threaded into the bore provided by the other end portion 32, which is of the same size as the coil throughout the balance of its length.

Such a tension member of coil spring wire can be threaded through the apertures 21, 22, and 19, 20, of the envelope, and then may have their ends 31, 32 secured together by bringing them into juxtaposition and twisting them in different directions.

The coil spring may be left-hand or right-hand, but in either event the two end portions form something similar to threads between the coils, and the coils expand sufficiently to permit the smaller end portion 31 to be threaded into the larger end portion 32 for relatively permanent securement.

The envelope 11 may then be mounted on the visor by expanding its tension members with the hands and sliding them over the end of the visor. The envelope or pocket is then located exactly where desired, and the tension members 29 and 30 may be so located that they draw the envelope flatly against the visor and maintain it in a flat condition.

When bulging articles are placed in the envelope and the flap closed, the coil springs tend, nevertheless, to pull the envelope into as flat condition as possible, drawing the contents tightly against the visor, because the coil springs grip the fabric of the visor and tend to remain in their original positions. The coil springs also tend to hold the contents in the envelope by drawing it to a substantially flat condition, even though the flap is not closed.

Various types and sizes of coil springs might be employed, but we prefer to use a helix of substantially 15/1000 pitch with a music wire size of 15/1000 coiled to 1/8 inch outer diameter.

It is also important that the seams of the envelope be of sufficient strength so that they will not be pulled out by the tension which is placed upon them by the helical wire coils when the envelope is distended, and the present seams are admirably suited to this end.

Referring to Figure 2, this is a view showing a modification comprising a double pocket unit. Either half of this pocket unit is substantially similar to the one previously described throughout all of its parts, except in the double unit two central seams 33, 34 are employed; and the apertures 35, 36 for a central tension member are located at the top and bottom between these seams instead of being located inwardly of an end seam. The double flap, double pocket of Figure 2 is preferably provided with three supporting tension members of the class described.

The method of making the pocket units is substantially as follows:

Blanks of a suitable shape, as shown, are cut or blanked out of whole sheets of plastic in the form shown in Figure 7 for the single pocket or a suitable shape for the double pocket. This blank form includes a flap formation which is cut out of the opposite end of another blank, and the side edges of the blank are suitably slit to provide the apertures for the tension members.

The flap and body are then preferably provided with the female and male snap fastener members, suitably located for later engagement, and the parts of the blank are folded along a central line to constitute the front and back of an envelope with the edges in alignment.

Both of the edges are preferably fused together simultaneously by the use of two pairs of dies and by the application of pressure and passage of electric current of high frequency, and of a current intensity sufficient to fuse partially the adjacent surfaces of the envelope portions between the dies so that they are integrally fused together and provided with a continuous seal.

The dies employed are preferably provided with a multiplicity of similarly shaped lugs of the same area on both sides of the plastic, these lugs being elongated and extending parallel to each other to give a greater fused area in the seam. The lugs preferably extend diagonally to the edge so that the depressions which are formed in the seam overlap each other lengthwise of the seam, thereby making a stronger and tighter seal at the seam.

The envelope is then preferably provided with its tension members which are made endless by permanently securing their ends together, the tension members passing through the envelope and out of apertures at the top and bottom at each end.

It will thus be observed that we have invented an improved pocket unit for support upon the visor of an automotive vehicle, which pocket unit can be constructed as a single pocket or envelope, or as a double pocket.

There are many articles which the users of automotive vehicles like to carry in a convenient place but which are subject to breakage, such as eye glasses, and which can be safely disposed in such a pocket on the visor.

The tension members which encircle the visor can also be used for the support of maps and other papers, and long pencils on the back side or opposite side of the visor, and these tension members tend to draw the present pockets into a flat condition when they are properly adjusted.

The present envelopes are strong and durable, and they may be manufactured economically because the number of operations has been reduced to a minimum and there is a minimum wastage of material.

The contents are readily visible and the present pocket units may be used for a long period of time without likelihood of being torn or otherwise damaged.

While we have illustrated a preferred embodiment of our invention, many modifications may be made without departing from the spirit of the invention, and we do not wish to be limited to the precise details of construction set forth, but desire to avail ourselves of all changes within the scope of the appended claims.

Having thus described our invention, what we claim as new and desire to secure by Letters Patent of the United States, is:

1. An attachment for an automobile sun visor, comprising a pair of endless coil springs adapted to extend about the sun visor transversely to its longest dimension, each spring being provided with a smaller tightly coiled end portion adapted to be threaded into the other end of the spring, the said springs being spaced from each other to support pencils, maps, and the like on the visor, and a translucent plastic envelope carried by said springs on one side of said visor, the said envelope comprising a substantially rectangular piece of plastic provided with a narrower flap at one end, said plastic being folded upon itself and having its end portions discontinuously fused together at spaced points, the said envelope being provided with slots extending inwardly at its fold at each end, leaving apertures between the folded portion of the envelope and the discontinuously fused end portions through which the springs pass, and the said shorter flap exposing open apertures at the upper edges of said envelope from which the springs emerge.

2. An attachment for an automobile sun visor, comprising a pair of endless coil springs adapted to extend about the sun visor transversely to its longest dimension, each spring being provided with a smaller tightly coiled end portion adapted to be threaded into the other end of the spring, the said springs being spaced from each other to support pencils, maps, and the like on the visor, and a translucent plastic envelope carried by said springs on one side of said visor, the said envelope comprising a substantially rectangular piece of plastic provided with a narrower flap at one end, said plastic being folded upon itself and having its end portions discontinuously fused together at spaced points, the said envelope being provided with slots extending inwardly at its fold at each end, leaving apertures between the folded portion of the envelope and the discontinuously fused end portions through which the springs pass, and the said shorter flap exposing open apertures at the upper edges of said envelope from which the springs emerge, the said flap overlapping the envelope and closing its open end, and the flap and overlapped part of the envelope being provided with complementary snap fasteners for securing the flap in closed position.

RAYMOND B. PFEIFER.
LESLIE GILBERT HEYDEN.

References Cited in the file of this patent

UNITED STATES PATENTS

| Number | Name | Date |
|---|---|---|
| 211,725 | Foster | Jan. 28, 1879 |
| 1,570,696 | Moore et al. | Jan. 26, 1926 |
| 2,048,105 | Cobbs | July 21, 1936 |
| 2,442,091 | Mann et al. | May 25, 1948 |
| 2,453,843 | Hanson | Nov. 16, 1948 |
| 2,486,096 | Axford et al. | Oct. 25, 1949 |
| 2,517,337 | Nodle | Aug. 1, 1950 |
| 2,520,737 | Romeyn et al. | Aug. 29, 1950 |
| 2,524,584 | Zehr | Oct. 3, 1950 |
| 2,550,006 | Dreyfus | Apr. 24, 1951 |